United States Patent [19]
Bobry

[11] Patent Number: 5,029,285
[45] Date of Patent: Jul. 2, 1991

[54] POWER BACK FEED PROTECTION DEVICE
[75] Inventor: Howard R. Bobry, Edmonds, Wash.
[73] Assignee: Albar, Inc., Lynnwood, Wash.
[21] Appl. No.: 511,549
[22] Filed: Apr. 20, 1990
[51] Int. Cl.[5] .......................... H02J 9/06; H02M 7/44
[52] U.S. Cl. ........................................ 307/64; 307/83; 363/97
[58] Field of Search ................. 307/43, 64, 83, 85–87, 307/110–112, 66; 361/35, 36, 92; 340/333; 323/258, 343, 340; 363/97; 315/86

[56] References Cited
U.S. PATENT DOCUMENTS 3,873,846  3/1975  Morio et al. ......................... 358/190
4,916,329  4/1990  Dang et al. ........................... 307/66

Primary Examiner—A. D. Pellinen
Assistant Examiner—Richard T. Elms
Attorney, Agent, or Firm—Pearne, Gordon, McCoy & Granger

[57] ABSTRACT

In a backup power supply, a pair of back-to-back auxiliary transformers are used to isolate the inverter control source, the inverter, and the a.c. line. A single-pole double-throw relay is used to selectably connect the a.c. line to the power supply or the auxiliary transformers to each other. When the auxiliary transformers are connected, the inverter operates and the a.c. line is isolated from the power supply and no power can feed back from the power supply to the a.c. lines. When the a.c. line is connected to the power supply, the auxiliary transformers are unconnected and the inverter is inoperative.

3 Claims, 1 Drawing Sheet

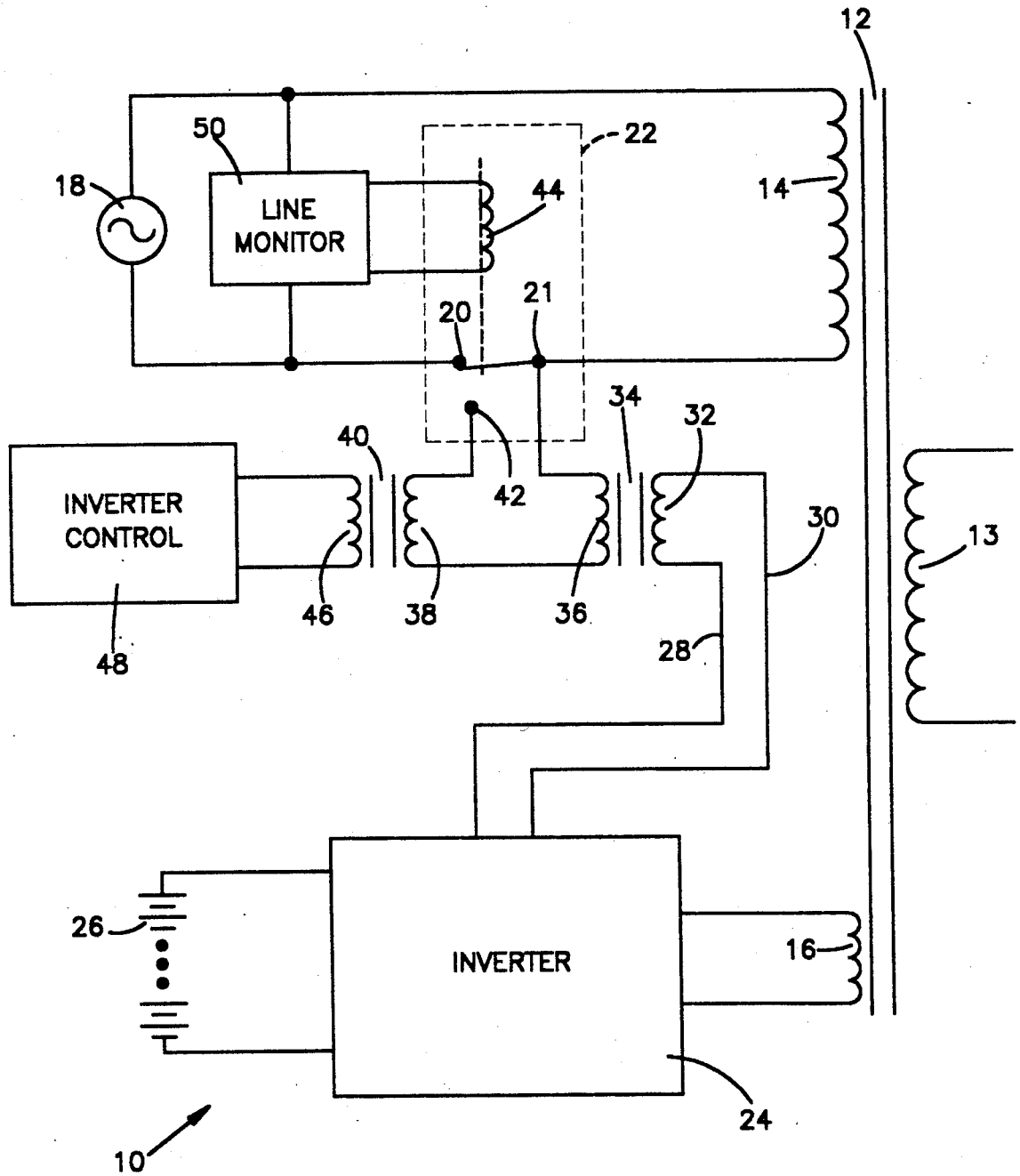

POWER BACK FEED PROTECTION DEVICE

BACKGROUND OF THE INVENTION

The present invention relates to a power supply normally powered by an alternating current line but switchable to direct current power and, in particular, to a circuit for preventing back feed into the alternating current power line.

Standby or uninterruptible power supplies for computer, cable TV, and other applications operate by switching to an internal, inverter power source (operating from batteries) when utility power is unavailable. Typically, such power supplies use an input transformer having two isolated primary windings, one of which may be driven by the alternating current power line, the other capable of being driven by an inverter circuit.

The presence of either of these two power sources on its respective primary winding produces a voltage on the other primary winding, due to normal transformer action. Typically, the inverter operates at low voltage, so the voltage induced on the inverter primary winding is in fact useful for purposes such as battery charging and powering control circuitry.

When the inverter is operating, however, a potentially hazardous voltage appears at the line primary winding, due to the turns ratio between the inverter and line primary windings. Normally, this inverter operation occurs only during a power failure, so the alternating current power line is open-circuited at some point. A repair technician or lineman may be subjected to this hazardous voltage, since they are working on what they believe to be a "dead" line.

In order to prevent this problem, it is required that the line primary winding be positively disconnected from the alternating current power line when the inverter is operating. This is normally done with a double-pole relay or contactor. One pole of the relay is normally closed and is used to switch the line, while the other pole is normally open and is used to switch the inverter battery supply. If no power is applied to the relay coil, the power supply operates from the power line, and the inverter is not connected to its battery. In the event of an alternating current power line failure, control circuits apply power to the relay coil, disconnecting the alternating current power line and connecting the inverter to its battery. It should be impossible for the inverter to operate unless the relay is pulled in and thus the power line isolated from the line primary winding.

There are two problems with this approach. First, with many contactor or relay designs, it is possible for a contact to weld in one position, and there is enough free play in the armature for the other contact to be pulled into the alternate position. In other words, it is possible for the line pole to weld stuck in the normally closed position. When power is applied to the relay coil, the armature can still move enough for the inverter pole to transfer to the closed position, applying power to the inverter. The welded or stuck contact has defeated the safety purpose of the relay.

In addition, the inverter pole must be rated to handle the full battery current required by the inverter. In a typical system, with a 36 volt nominal battery, the line pole may handle a maximum of 12 amps, while the inverter pole must handle on the order of 40-45 amps (due to constant power output from the system, but reduced input voltage). This results in a rather large and expensive relay or contactor.

SUMMARY OF THE INVENTION

In accordance with the invention, there is provided a power supply normally powered by an alternating current power line. The power supply comprises a main transformer having a line primary winding and an inverter primary winding. It also includes a control signal source providing a control signal and a switched direct current source connected in series relationship with the inverter primary winding. The switched direct current source is switchable by the control signal.

Also included is a first auxiliary transformer having a first primary winding and a first secondary winding, the first primary winding being connected to the control signal source. In addition, it includes second auxiliary transformer having a second primary winding and a second secondary winding, the second secondary winding being connected to the switched direct current source. Also included is a switching means having a first conducting state and a second conducting state.

The line primary winding and the alternating current power line are connected in series relationship through the switching means when the switching means is in the first conducting state, and the first secondary winding and the second primary winding are connected in series relationship through the switching means when the switching means is in the second conducting state.

The control signal is transmitted to the switched direct current source via the first and second auxiliary transformers and the alternating current power line is isolated from the line primary winding when the switching means is in the second conducting state.

The invention achieves positive disconnection from the power line with higher reliability and at lower cost than previous methods.

BRIEF DESCRIPTION OF THE DRAWING

The drawing is a schematic diagram of a power supply according to the invention.

DESCRIPTION OF THE PREFERRED EMBODIMENTS

Referring to the drawing, a power supply according to the invention is shown generally indicated by the numeral 10.

A transformer 12 is provided with a line primary winding 14 and an inverter primary winding 16. Output power from the power supply 10 is provided by the transformer 12 through a secondary winding 13.

An alternating current power line 18 (e.g. 110 volt, 60 Hz, commercial power) is normally connected across the winding 14 through the normally closed contact 20 and the pole 21 of a single-pole, double-throw relay 22.

The output of an inverter 24 is connected in series across the winding 16. Direct current is supplied to the inverter 24 by batteries 26 connected in series therewith. The operation of the inverter 24 is controlled by a control signal on a pair of wires 28, 30. The pair of wires 28, 30 are connected across the secondary winding 32 of an auxiliary transformer 34. The primary winding 36 of the transformer 34 is connected in series with the secondary winding 38 of an auxiliary transformer 40 through the pole 21 and the normally open contact 42 of the relay 22 when the coil 44 of the relay 22 is energized.

The primary winding 46 of the transformer 40 is connected in series across the inverter control 48.

A line monitor 50 is connected across the power line 18. The output of the line monitor 50 is connected across the relay coil 44.

Normally, the power line 18 is connected through the normally closed contact 20 and the pole 21 to the winding 14. The transformer 12 transforms this power and provides it to an unshown load through the secondary winding 13.

When the pole 21 is contacting the contact 20, the contact 42 is open, preventing any current through the windings 36, 38. This isolates the inverter control 48 from the inverter 24.

The inverter 24 contains switching means (e.g. transistors or relays) capable of switching the current provided by the batteries 26 across the winding 16 in alternating polarity. This switching is controlled by the control signal on the pair of wires 28, 30. When the contact 42 is open, no signal can be passed between the transformers 34, 40 to the inverter 24 and it supplies no current to the winding 16.

The line monitor 50 monitors one or more characteristics of the power line 18 (e.g. voltage, frequency, or noise) and energizes the relay coil 44 when one or more of the monitored characteristics takes on an undesirable attribute (e.g. low or high voltage, frequency deviations, or excess noise).

When the coil 44 is energized, the pole 21 contacts the contact 42. This completes the circuit between the windings 36, 38. At the same time, the contact 20 is opened, thus isolating the power line 18 from the winding 14.

The inverter control 48 provides an alternating current control signal (usually a square-wave) for control of the inverter 24. The inverter control 48 may be, for example, powered by the batteries 26 or it may have its own power source.

When the contact 42 is closed, this control signal is transmitted across the transformers 34, 40 to the inverter 24. This causes the inverter 24 to operate, providing alternating current to the winding 16. The power in the winding 16 is then transformed by the transformer 12 and provided to the unshown load via the secondary winding 13.

When the inverter 24 is operating, a voltage is also produced by the transformer 12 across the winding 14, but because the contact 20 is open, no voltage is applied to the power line 18.

This approach achieves positive disconnection from the power line 18 with higher reliability and at lower cost than previous methods.

If one of the contacts 20, 42 should weld or stick in either position, there is no safety hazard. The inverter control is fully isolated by the two auxiliary transformers 34, 40 in one position, keeping the inverter 24 from operating. In the other position, the power line 18 is isolated from the inverter induced voltages on the transformer 12.

In addition, the inverter control 48 operates at relatively low current, so the rating required of the relay 22 is simply that of the a.c. input to the power supply 10, or in the typical example given, 12 amps. A single-pole 12 amp relay is much less expensive than a double-pole 45 amp relay.

It should be noted that other isolating switching means can be substituted for the relay 22, for example, an opto-electric isolator may be employed.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A power supply normally powered by an alternating current power line, the power supply comprising:
   a main transformer having a line primary winding and an inverter primary winding;
   a control signal source providing a control signal;
   a switched direct current source connected in series relationship with said inverter primary winding, said switched direct current source being switchable by said control signal;
   a first auxiliary transformer having a first primary winding and a first secondary winding, said first primary winding being connected to said control signal source;
   a second auxiliary transformer having a second primary winding and a second secondary winding, said second secondary winding being connected to said switched direct current source; and
   a switching means having a first conducting state and a second conducting state, said line primary winding and said alternating current power line being connected in series relationship through said switching means when said switching means is in the first conducting state, and said first secondary winding and said second primary winding being connected in series relationship through said switching means when said switching means is in the second conducting state, whereby the control signal is transmitted to said switched direct current source via said first and second auxiliary transformers and said alternating current power line is isolated from said line primary winding when said switching means is in said second conducting state.

2. A power supply according to claim 1, further comprising a line monitor connected to said switching means and said alternating current power line, wherein said switching means is normally in said first conducting state and assumes said second conducting state when said line monitor senses an undesirable characteristic on said alternating current power line.

3. A power supply according to claim 1, wherein said switching means is a single-pole, double-throw relay.

* * * * *